United States Patent [19]

Kohsaka et al.

[11] Patent Number: 5,010,146

[45] Date of Patent: Apr. 23, 1991

[54] POLYESTER CARBONATE COPOLYMERS, PROCESSES FOR PREPARING SAME AND POLYESTER RESIN COMPOSITIONS CONTAINING SAID COPOLYMERS

[75] Inventors: Masaki Kohsaka; Isaburou Higashi; Yoshinori Akana; Mikio Hashimoto; Tadao Yatsu, all of Yamaguchi, Japan

[73] Assignee: Mitsui Petrochemical Industries, Ltd., Tokyo, Japan

[21] Appl. No.: 365,687

[22] Filed: Jun. 14, 1989

[30] Foreign Application Priority Data

Jun. 16, 1988 [JP] Japan .................. 63-149129

[51] Int. Cl.$^5$ ................ C08L 69/00; C08L 67/02
[52] U.S. Cl. .................. 525/439; 525/466
[58] Field of Search .................. 525/439, 466

[56] References Cited

U.S. PATENT DOCUMENTS

| 3,426,100 | 2/1969 | McDonough | 525/439 |
| 3,998,908 | 12/1976 | Buxbaum | 525/466 |
| 4,226,961 | 10/1980 | Motz | 525/439 |
| 4,367,317 | 1/1983 | Fox | 525/439 |
| 4,429,083 | 1/1984 | Nakagawa et al. | 525/439 |

FOREIGN PATENT DOCUMENTS 954500  4/1964  United Kingdom ............... 525/439

Primary Examiner—John C. Bleutge
Assistant Examiner—David Buttner
Attorney, Agent, or Firm—Birch, Stewart, Kolasch & Birch

[57] ABSTRACT

In accordance with the present invention, there are provided polyester carbonate copolymers obtained by polymerization of a mixture of 20–80% by weight of an alkylene terephthalate oligomer [I] containing ethylene terephthalate as main structural units and having an intrinsic viscosity [η], as measured at 25° C. in o-chlorophenol, of less than 0.6 dl/g, and 20–80% by weight of a carbonate oligomer [II] containing 2,2-bis(4-hydroxyphenyl)propane as main structural units and having an intrinsic viscosity [η], as measured at 25° C. in o-chlorophenol, of less than 0.6 dl/g, said copolymers having an intrinsic viscosity [η], as measured at 25° C. in o-chlorophenol, of 0.4–1.2 dl/g and a glass transition temperature (Tg) of 80°–140° C. with a single peak, and polyester resin compositions containing said copolymers, said resin composition being excellent in transparency, heat resistance and mechanical strength.

2 Claims, No Drawings

POLYESTER CARBONATE COPOLYMERS, PROCESSES FOR PREPARING SAME AND POLYESTER RESIN COMPOSITIONS CONTAINING SAID COPOLYMERS

FIELD OF THE INVENTION

1. Background of the Invention

This invention relates to polyester carbonate copolymers and processes for preparing the same. More particularly, this invention relates to polyester carbonate copolymers capable of giving molded articles having a glass transition temperature (Tg) with a single peak as measured by means of a differential scanning calorimeter (DSC) and being excellent in transparency, heat resistance and mechanical strength and to processes for preparing said polyester carbonate copolymers.

In another aspect, the invention relates to polyester resin compositions containing such polyester carbonate copolymers as mentioned above.

2. Discussion of Related Art

Resin compositions comprising polyesters, such as polyethylene terephthalate, and polycarbonates have been known from many prior art references [e.g. Japanese Patent Publn No. 14035/1961, Japanese Patent L-O-P Publns. Nos. 51445/1977, 51248/1978, 18375/1979 and 145751/1980, Japanese Patent Publns. Nos. 16137/1982 and 18391/1983, J. W. Barlow et al., Journal of Applied Polymer Science, Vol. 23, 85-99 (1979) and Hi Hui Wang et al., Makromolekulre Chemie Rapid Communications, Vol. 7, 255-259 (1986)].

It is noted from these prior art references that certain attempts have been made to prepare compositions excellent in transparency from polyesters and polycarbonates. However, Japanese Patent L-O-P Publns. Nos. 51445/1977 and 51248/1978, and Japanese Patent Publn. No. 18391/1983 disclose that compositions excellent in transparency can be accomplished only when they consist essentially of polyesters or polycarbonates. These prior art references further teach that when the proportion of the polyesters in the composition is nearly equal to that of the polycarbonate, no composition excellent in transparency is obtained. The compositions consisting essentially of polyesters as disclosed in the aforesaid prior art references involve such problems that said compositions are poor in such properties as heat resistance and impact resistance even though they are good in transparency, and that the external surface of molded articles obtained from said compositions tend to sinkmark or warp. Similarly, the compositions consisting essentially of polycarbonates involve the problem of being poor in such properties as stability to chemicals, stress crack resistance and melt flowability, even though they have good transparency and excellent heat resistance properties.

According to Hi Hui Wang et al., Makromolekulre Chemie Rapid Communication, Vol. 7, 255-259 (1986) cited previously as one of the prior art references, it is described that resin compositions containing polyesters and polycarbonates in nearly equal proportions are transparent and have a single glass transition temperature. The resin compositions disclosed in this prior art reference, however, involve the problems of all being low in molecular weight and poor in mechanical strength such as impact resistance, and hence they are no longer acceptable for molding purposes.

With the view toward solving the problems associated with such polyester resin compositions as mentioned above, there have been made various improvements. For instance, Japanese Patent Publn. No. 41442/1974 discloses resin compositions comprising a blend of polyethylene terephthalate (PET), polycarbonate and a rubber component. By virtue of blending the rubber component, the resulting polyester resin composition improves in impact strength but, on the other hand, decreases in stiffness and heat resistance.

Furthermore, Japanese Patent L-O-P Publn. No. 176345/1984 also discloses polyester resin compositions improved in impact strength, said compositions comprising a blend of polyethylene terephthalate, polycarbonate, and polyethylene terephthalate having introduced thereinto a component unit derived from cyclohexane dimethanol. By virtue of blending polyethylene terephthalate having introduced thereinto the above-mentioned component unit derived from cyclohexane dimethanol, the resulting polyester resin composition improves in impact strength to a certain extent, but, because this blended resin is amorphous, said composition decreases in chemical resistance. For the purpose of improving chemical resistance of the polyester resin composition, if said composition is improved in crystallinity index by using certain amounts of other components to be mixed therewith the resulting polyester resin composition sharply decreases in impact strength. As can be seen from the foregoing, the polyester resin compositions involve the problem in that it is very difficult to improve the characteristics of said compositions, such, impact resistance and the like, while maintaining an adequate balance without decreasing the excellent characteristics which are inherent in polyethylene terephthalate, such as stiffness, heat resistance and chemical resistance.

OBJECT OF THE INVENTION

An object of the present invention is to solve such problems associated with the prior art as mentioned hereinbefore.

Another object of the present invention is to provide polyester carbonate copolymers which are excellent in mechanical properties such as impact resistance and stress crack resistance, heat resistance and transparency, and which are also excellent in melt flowability at the time of molding thereof, and to provide processes for preparing said copolymers.

Still another object of the present invention is to provide polyester resin compositions containing such polyester carbonate copolymers, said compositions being excellent in stiffness, heat resistance, moldability and chemical resistance and also being excellent in impact resistance.

SUMMARY OF THE INVENTION

The polyester carbonate copolymers of the present invention are those prepared by polymerization of 20–80% by weight of an alkylene terephthalate oligomer [I] containing ethylene terephthalate as main structural units and having an intrinsic viscosity $[\eta]$ of less than 0.6 dl/g as measured at 25° C. in o-chlorophenol and 20–80% by weight of a carbonate oligomer containing 2,2-bis(4-hydroxyphenyl)propane as main structural units and having an intrinsic viscosity $[\eta]$ of less than 0.6 dl/g as measured at 25° C. in o-chlorophenol, said polyester carbonate copolymers having an intrinsic viscosity $[\eta]$ of 0.4–1.2 dl/g as measured at 25° C. in o-chlorophenol and a glass transition temperature (Tg) of 80°-140° C. with a single peak.

The processes for preparing the polyester carbonate copolymers of the present invention comprise melting with stirring a mixture of 20-80% by weight of an alkylene terephthalate oligomer [I] and 20-80% by weight of a carbonate oligomer [II], and allowing the resulting molten mixture to undergo polycondensation reaction while removing volatile components from the system under reduced pressure.

The polyester resin compositions of the present invention contain (i) 50-10 parts by weight of polyalkylene terephthalate, (ii) 50-90 parts by weight of polycarbonate (provided (i)+(ii)=100 parts by weight) and (iii) 3-50 parts by weight, based on 100 parts of the sum total of the above-mentioned (i) and (ii), of a polyester carbonate copolymer, said polyester carbonate copolymer (iii) being obtained by polymerization of a mixture of 20-80% by weight of an alkylene terephthalate oligomer [I] containing ethylene terephthalate as main structural units and having an intrinsic viscosity [$\eta$] of less than 0.6 dl/g as measured at 25° C. in o-chlorophenol and 20-80% by weight of a carbonate oligomer [II] containing 2,2bis(4-hydroxyphenyl)propane as main structural units and having an intrinsic viscosity [$\eta$] of less than 0.6 dl/g as measured as 25° C. in o-chlorophenol, and having an intrinsic viscosity of 0.4-1.2 dl/g as measured at 25° C. in o-chlorophenol and a glass transition temperature (Tg) of 80-140° C. with a single peak.

The polyester carbonate copolymers of the present invention are used as a compatibilizing agent for polymers especially polyalkylene terephthalate and polycarbonate.

DETAILED DESCRIPTION OF THE INVENTION

The polyester carbonate copolymers of the present invention, processes for preparing same and the polyester resin compositions containing said polyester carbonate copolymers are illustrated below in more detail.

First, the polyester carbonate copolymers of the present invention are illustrated hereinafter.

Alkylene terephthalate oligomer [I]

The alkylene terephthalate oligomer [I] used in the present invention is comprised of dicarboxylic acid component units and diol component units, and preferably containing ethylene terephthalate as main structural units. Usually, the alkylene terephthalate oligomers [I] containing 50-100 mol % of the ethylene terephthalate structural units are used. Of these oligomers, preferred are the alkylene terephthalate oligomers [I] containing 70-100 mol % of the ethylene terephthalate structural units.

The main dicarboxylic acid component units constituting the above-mentioned alkylene terephthalate oligomers [I] used in the present invention are terephthalic acid component units. However, the dicarboxylic acid component units may contain small amounts of other aromatic dicarboxylic acid components in addition to the terephthalic acid component units. The aromatic dicarboxylic acid components used in addition to the terephthalic acid components include, for example, dicarboxylic acid component units such as isophthalic acid, phthalic acid and naphthalenecarboxylic acid.

Furthermore, the main diol component units also constituting the above-mentioned alkylene terephthalate oligomers [I] are ethylene glycol component units. However, the diol component units may contain small amounts of other diol component units in addition to the ethylene glycol component units. Other preferred diol component units in addition to the ethylene glycol component units include, for example, diol component units of 3-15 carbon atoms such as 1,3-propanediol, 1,4-butanediol, neopentyl glycol, cyclohexanediol, cyclohexanedimethanol, 1,4-bis($\beta$-hydroxyethoxy)benzene, 1,3-bis($\beta$-hydroxyethoxy)benzene, 2,2-bis(4-$\beta$-hydroxyethoxyphenyl) propane and bis(4-$\beta$-hydroxyethoxyphenyl)sulfone.

In addition to the above-mentioned aromatic dicarboxylic acid component units and diol component units, the alkylene terephthalate oligomers [I] may contain, if necessary, small amounts of polyfunctional compound component units. The polyfunctional compound component units include, for example, aromatic polybasic acids such as trimellitic acid, trimesic acid and 2,3',5,5'-tetracarboxydiphenyl; aliphatic polybasic acids such as butanetetracarboxylic acid; aromatic polyols such as phloroglucin and 1,2,4,5-tetrahydroxybenzene; aliphatic polyols such as glycerin, trimethyloloethane, trimethylolpropane and pentaerythritol; and oxypolycarboxylic acids such as tartaric acid and malic acid.

In the above-mentioned alkylene terephthalate oligomers [I], the terephthalic acid component units are present in an amount of usually 50-100 mol %, preferably 70-100 mol %, the aromatic dicarboxylic acid component units other than the terephthalic acid component units in an amount of usually 0-50 mol %, preferably 0-30 mol %, the ethylene glycol component units in an amount of usually 50-100 mol %, preferably 70-100 mol %, the diol component units other than the ethylene glycol component units in an amount of usually 0-50 mol %, preferably 0-30 mol %, and the polyfunctional compound component units in an amount of usually 0-2 mol %, preferably 0-1 mol %.

The above-mentioned alkylene terephthalate oligomers [I] may be prepared by any processes including, for example, a process in which an aromatic dicarboxylic acid consisting essentially of terephthalic acid, and diol consisting essentially of ethylene glycol are allowed to undergo directly to polycondensation, and a process in which an aromatic dicarboxylic acid ester consisting essentially of terephthalic acid diester, such as dimethyl terephthalate, and diol consisting essentially of ethylene glycol are subjected to ester interchange. Of these processes, the direct polycondensation process is preferred, because the resulting alkylene terephthalate oligomers are excellent in hue and transparency.

Catalysts used at the time of the polycondensation include those commonly used in polycondensation reaction such as antimony compounds, titanium compounds and germanium compounds. Of these catalysts, preferred are germanium compounds such as germanium oxide and tetraalkoxy germanium, because the resulting alkylene terephthalate oligomers are excellent in hue.

The alkylene terephthalate oligomers [I] used in the present invention have an intrinsic viscosity [$\eta$] (a) value as measured at 25° C. in o-chlorophenol) of usually less than 0.6 dl/g preferably less than 0.55 dl/g and further preferably less than 0.5 dl/g.

In the present invention, the alkylene terephthalate oligomer [I] is used in an amount, based on 100% by weight of the total sum of the alkylene terephthalate oligomer [I] and the carbonate oligomer, [II], of usually 20–80% by weight, preferably 25–75% by weight and further preferably 30–70% by weight. If the amount of the alkylene terephthalate oligomer [I] used exceeds 80% by weight, the resulting polyester carbonate copolymer exhibits a tendency that a glass transition temperature (Tg) of said copolymer comes to draw near the glass transition temperature (Tg) of polyalkylene terephthalate, whereby the copolymer decreases in heat resistance and also in mechanical strength such as impact resistance. On the one hand, if the amount of the alkylene terephthalate oligomer [I] used is less than 20% by weight, the resulting polyester carbonate copolymer tends to decrease in flowability and also in chemical stability and stress crack resistance.

Carbonate oligomer [II]

The carbonate oligomer [II] used in the present invention is a carbonate oligomer containing 2,2-bis(4-hydroxyphenyl)propane [Bisphenol A] as main structural units. In the present invention, usually the carbonate oligomer [II] containing 50–100 mol % of the 2,2-bis(4-hydroxyphenyl)propane structural units is used, particularly the carbonate oligomer [II] containing 70–100 mol % of the 2,2-bis(4-hydroxyphenyl)propane structural units. In the present invention, the above-mentioned carbonate oligomer [II] may contain small amounts of other aromatic diol component units in addition to the 2,2bis(4hydroxyphenyl)propane component units. Useful aromatic diol component units other than the 2,2-bis(4-hydroxyphenyl)propane component units include, in concrete, diol component units such as 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl) butane, 2,2-bis(4-hydroxy-3,5-diethylphenyl)propane, 2,2-bis(4-hydroxy-3,5-dipropylphenyl)propane, 1,1-bis(4-hydroxyphenyl)cyclohexane, bis(4-hydroxyphenyl)ketone, bis(4-hydroxyphenyl)ether, bis(4-hydroxyphenyl)thioether, bis(4-hydroxyphenyl)sulfone and 4,4'-dihydroxybiphenyl.

The above-mentioned carbonate oligomer [II] may contain small amount of aliphatic diol component units in addition to the aromatic diol component units. Useful aliphatic diol component units include, for example, diol component units of 3–15 carbon atoms such as ethylene glycol, 1,3-propanediol, 1,4-butane diol, neopentyl glycol, cyclohexanediol, cyclohexane dimethanol, 1,4-bis($\beta$-hydroxyethoxy) benzene, 1,3-bis($\beta$-hydroxyethoxy)benzene, 2,2-bis(4-$\beta$hydroxyethoxyphenyl)propane and bis(4-$\beta$-hydroxyethoxyphenyl)sulfone.

In addition to the aromatic diol component units and aliphatic diol components units mentioned above, the above-mentioned carbonate oligomer [II] may contain, if necessary, small amounts of polyfunctional compound component units. Useful polyfunctional compound component unit includes, for example, aromatic polyols such as phloroglucin and 1,2,4,5-tetrahydroxybenzene; aliphatic polyols such as glycerin, trimethylolethane, trimethylolpropane and pentaerylthritol; aromatic polybasic acids such as trimellitic acid, trimesic acid and 3,3',5,5'-tetracarboxydiphenyl; aliphatic polybasic acids such as butanetetracarboxylic acid; and oxypolycarboxylic acids such as tartaric acid and malic acid.

In the above-mentioned carbonate oligomers[II], preferably the 2,2-bis(4-hydroxyphenyl)propane component units are present in an amount of usually 50–100 mol %, preferably 70–100 mol %, the aromatic diol component units other than the 2,2-bis(4-hydroxyphenyl)propane component units in an amount usually of 0–50 mol %, preferably 0—30 mol %.

The above-mentioned carbonate oligomers [II] may be prepared by any methods include, for example, a process comprising interfacial polymerization of a diol component consisting essentially of 2,2-bis(4-hydroxyphenyl)propane and phosgen and a process comprising ester interchange of a diol component consisting essentially of 2,2-bis(4-hydroxyphenyl)propane and carbonic acid diester. Catalysts used in preparing the carbonate oligomer [II] by the ester interchange method include those commonly used in ester interchange reaction such as antimony compounds, titanium compounds, germanium compounds and tin compounds. Of these catalysts, preferably used are tin compounds such as stannous acetate and stannous oxalate, or germanium compounds such as germanium oxide and tetraalkoxy germanium.

The carbonate oligomers [II] used in the present invention have an intrinsic viscosity $[\eta]$(a) value as measured at 25° C. in o-chlorophenol) of usually less than 0.6 dl/g, preferably less than 0.55 dl/g and further preferably less than 0.5 dl/g.

In the present invention, the carbonate oligomer [II] is used in an amount, based on 100% by weight of the sum total of the alkylene terephthalate oligomer [I] and the carbonate oligomer[II], of usually 20–80% by weight, preferably 25–75% by weight and further preferably 30–70% by weight. If the amount of the carbonate oligomer [II] used is less than 20% by weight, the resulting polyester carbonate copolymer exhibits a tendency that a glass transition temperature (Tg) of said copolymer draws near the glass transition temperature (Tg) of polyalkylene terephthalate, whereby said copolymer decreases in heat resistance and also in mechanical strength such as impact resistance.

On the one hand, if the amount of the carbonate oligomer [II] used exceeds 80% by weight, the resulting polyester carbonate copolymer tends to decrease in flowability and also in chemical stability and stress crack resistance.

In addition to the alkylene terephthalate oligomer [I] and carbonate oligomer [II] mentioned above, the polyester carbonate copolymers of the present invention may contain, if necessary, various additives, for example, phosphate stabilizers such as trimethyl phosphate and triphenyl phosphate, and known organic filters, lubricants, slip agents, anti-blocking agents, antistatic agents, anti-foggants and pigments so long as they do not hinder the present invention from accomplishing its objects.

Polyester Carbonate Copolymer

The polyester carbonate copolymers of the present invention are obtained by copolymerization of the alkylene terephthalate oligomer [I] and the carbonate oligomer [II], as will be mentioned later.

The polyester carbonate copolymers obtained in the manner now described mainly contain the following structural units in the following amounts when an alkylene terephthalate oligomer, the content of ethylene terephthalate structural units of which is 100%, is used as the alkylene terephthalate oligomer [I] and a carbonate oligomer, the content of 2,2-bis(4-hydroxyphenyl)propane structural units of which is 100%, is used as the carbonate oligomer [II].

| | | Amounts (mol %) |
|---|---|---|
| (1) Linkage modes of Bisphenol A | | |
| —O—⟨C₆H₄⟩—C(CH₃)₂—⟨C₆H₄⟩—OCH₂CH₂O— | [I] | 15–45 mol %<br>preferably<br>20–40 mol % |
| —O—⟨C₆H₄⟩—C(CH₃)₂—⟨C₆H₄⟩—OC(O)—⟨C₆H₄⟩—C(O)— | [II] | 25–55 mol %<br>preferably<br>30–50 mol % |
| —O—⟨C₆H₄⟩—C(CH₃)₂—⟨C₆H₄⟩—O—C(O)—O—⟨C₆H₄⟩—C(CH₃)₂—⟨C₆H₄⟩—O— | [III] | 5–30 mol %<br>preferably<br>10–25 mol % |
| —O—⟨C₆H₄⟩—C(CH₃)₂—⟨C₆H₄⟩—O—C(O)—O—CH₂CH₂O— | [IV] | 0–20 mol %<br>preferably<br>0–15 mol % |
| (2) Linkage modes of terephthalic acid | | |
| —C(O)—⟨C₆H₄⟩—C(O)—O—CH₂CH₂O— | [V] | 30–80 mol %<br>preferably<br>40–70 mol % |
| —C(O)—⟨C₆H₄⟩—C(O)—O—⟨C₆H₄⟩—C(CH₃)₂—⟨C₆H₄⟩—O— | [VI] | 20–70 mol %<br>preferably<br>30–60 mol % |

The polyester carbonate copolymers of the present invention as illustrated above have an intrinsic viscosity [η], as measured at 25° C. in chlorophenol, of usually 0.4–1.2 dl/g, preferably 0.5–1.1 dl/g and further preferably 0.6–1.0 dl/g. If the intrinsic viscosity [η] of the polyester carbonate copolymer obtained is less than 0.4 dl/g, said copolymer tends to decrease in mechanical strength such as impact resistance and also in stress crack resistance. On the one hand, if the intrinsic viscosity [η] of the polyester carbonate copolymer exceeds 1.2 dl/g, said copolymer tends to decrease in melt flowability and moldability.

The polyester carbonate copolymers of the present invention have a glass transition temperature (Tg), as measured by means of a differential scanning calorimeter (DSC), of 80°–140° C. with a single peak. If the glass transition temperature (Tg) of the polyester carbonate copolymer is less than 80° C., said copolymer exhibits a tendency that a glass transition temperature (Tg) of the copolymer draws near the glass transition temperature (Tg) of polyalkylene terephthalate, whereby said copolymer decreases in heat resistance. On the one hand, if the glass transition temperature (Tg) of the polyester carbonate copolymer exceeds 140° C., said copolymer exhibits a tendency that the glass transition temperature (Tg) of the copolymer draws near the glass transition temperature (Tg) of polycarbonate, whereby said copolymer decreases in chemical resistance and stress crack resistance. The polyester carbonate copolymer tends to decrease in transparency if it has two or more peaks even when its glass transition temperature (Tg) is within the above-mentioned range.

Further, a molded plate having a 2 mm thick formed from the polyester carbonate copolymer has a haze of usually less than 25%, preferably less than 20% and further preferably less than 15%.

Process for Preparing Polyester Carbonate Copolymer

The processes for preparing the polyester carbonate copolymers of the present invention are illustrated hereinafter.

First, the alkylene terephthalate oligomere [I] and carbonate oligomer [II] constituting the polyester carbonate copolymer are prepared, respectively, by processes as mentioned previously.

The alkylene terephthalate oligomer [I] thus prepared before use is dried, for example, at 140° C. for at least 15 hours in an atmosphere of dried air or dried nitrogen, or under reduced pressure. Similarly, the carbonate oligomer [II] thus prepared is dried in an atmosphere of dried air or dried nitrogen, or under reduced pressure, for example, at 120° C. for at least 15 hours.

Subsequently, a mixture of 20–80% by weight of the dried alkylene terephthalate oligomer [I] and 20–80% by weight of the dried carbonate oligomer [II] is fed to a reaction vessel equipped with a stirring device and capable of operation under reduced pressure, melted and stirred to carry out the polycondensation reaction under reduced pressure while removing volatile components.

At the time of preparing the above-mentioned mixture, there may be added, if necessary, phosphate stabilizers and various known additives such as inorganic fillers, lubricants, slip agents, anti-blocking agents, antistatic agents, anti-foggants and pigments, so long as they do not hinder the present invention from accomplishing its objects.

In carrying out the above-mentioned polycondensation reaction, the reaction temperature employed is usually 260°–300° C., preferably 265°–295° C. and further preferably 270°–290° C., and the reduced pressure employed is usually 0.1–300 mm Hg, preferably 1–200 mm Hg. At the time when the above-mentioned, mixture is melted and stirred, the stirring time employed, though it may vary according to the melting temperature, is usually 0.5–15 hours, preferably 1–10 hours. When the reaction product increases in viscosity with the lapse of the stirring time, it is appropriate to carry out the polycondensation reaction while gradually elevating the reaction temperature within the above-mentioned temperature range.

Polycondensation catalysts used in the above-mentioned polycondensation reaction in accordance with the present invention may include those commonly used in polycondensation reaction such as titanium compounds, antimony compounds, tin compounds and germanium compounds. Of these polycondensation catalysts, preferred are tin compounds such as stannic acetate and stannic oxalate or germanium compounds such as germanium oxide and tetraalkoxy germanium.

After the completion of the above-mentioned polycondensation reaction, the reaction product is withdrawn under pressure from the reaction vessel in strand form, and recovered according to the usual way such as cutting to obtain a transparent polyester carbonate copolymer.

Polyester Resin Composition

Subsequently, polyester resin compositions containing polyester carbonate copolymers mentioned above are illustrated.

The polyester resin compositions of the present invention are composed basically of polyalkylene terephthalate, polycarbonate and such polyester carbonate copolymer as mentioned previously.

First, the polyalkylene terephthalate which constitutes the polyester resin composition is illustrated.

This polyalkylene terephthalate is preferably a polyalkylene terephthalate containing ethylene terephthalate component units as main structural units or a polyalkylene terephthalate containing 1,4-butylene terephthalate units as main structural units. Such component units as mentioned above are formed from ethylene glycol or 1,4-butylene glycol and terephthalic acid. The proportion of the ethylene terephthalate component units or the 1,4-butylene terephthalate component units is usually at least 50 mol %, preferably at least 70 mol %. The polyalkylene terephthalate used in the present invention may contain both of ethylene terephthalate and butylene terephthalate component units.

Such polyalkylene terephthalate as mentioned above may contain other component units than the ethylene terephthalate units of the 1,4-butylene terephthalate units in an amount of less than 50 mol %, preferably less than 30 mol %.

Other aromatic dicarboxylic acid component units which form the above-mentioned other component units constituting the polyalkylene terephthalate include, in concrete, such component units as may be derived, for example, from isophthalic acid, phthalic acid and naphthalene dicarboxylic acid. Furthermore, other diol component units include, in concrete, such component units as may be derived, for example, from diols of 3–15 carbon atoms such as propylene glycol, neopentyl glycol, cyclohexane diol, cyclohexane dimethanol, 1,4-bis(β-hydroxyethoxy)benzene, 1,3-bis(β-hydroxyethoxy)benzene, 2,2-bis(4-β-hydroxyethoxyphenyl)propane and bis(4-β-hydroxyethoxyphenyl)sulfone.

In addition to the above-mentioned aromatic dicarboxylic acid component units and diol component units, the polyalkylene terephthalate may contain, if necessary, component units derived from other polyfunctional compounds.

Other polyfunctional compounds mentioned above, from which the above-mentioned component units are formed, may include, for example, aromatic polybasic acids such as trimellitic acid, trimesic acid and 3,3′,5,5′-tetracarboxydiphenyl; aliphatic polybasic acids such as butanetetracarboxylic acid; aromatic polyols such as phloroglucin and 1,2,4,5-tetrahydroxybenzene; aliphatic polyols such as glycerin, trimethylolethane, trimethylolpropane and pentaerythritol; and oxypolycarboxylic acids such as tartaric acid and malic acid.

In the polyalkylene terephthalate, the amount of the terephthalic acid component units present is usually 50–100 mol %, preferably 70–100 mol %, that of the aromatic dicarboxylic acid component units other than the terephthalic acid component units is usually 0–50 mol %, preferably 0–30 mol %, that of the ethylene glycol or 1,4-butylene glycol component units is usually 50–100 mol %, preferably 70–100 mol %, that of the diol component units other than the ethylene glycol or 1,4-butylene glycol component units is usually 0–50 mol %, preferably 0–30 mol %, and that of the polyfunctional compound component units is usually 0–2 mol %, preferably 0–1 mol %.

The polyalkylene terephthalates as illustrated above have an intrinsic viscosity $[\eta]$ (a value as measured at 25° C. in o-chlorophenol) of usually 0.5–1.5 dl/g, preferably 0.6–1.2 dl/g, a melting point of usually 210°–265° C., preferably 220°–260° C., and a glass transition temperature of usually 50°–120° C., preferably 60°–100° C. Such polyalkylene terephthalates as mentioned above have a weight average molecular weight of usually 25000–100000, preferably 35000–90000.

The above-mentioned polyalkylene terephthalates may be prepared in the usual way.

Subsequently, polycarbonates constituting the polyester resin composition are illustrated hereinafter.

The polycarbonates are polymers or copolymers having the component units represented by the following formula.

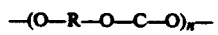

wherein R represents a divalent aromatic hydrocarbon group.

These polycarbonates are preferably those having 2,2-bis(4-hydroxyphenyl)propane (so-called Bisphenol A) as main structural units, and usually used are polycarbonates containing 50–100 mol % of the 2,2-bis(4-hydroxyphenyl) propane component units and, in particular, polycarbonate containing 70–100 mol % of said component units.

In addition to the 2,2-bis(4-hydroxyphenyl)-propane component units constituting the polycarbonate, other aromatic diol component units used may include for example, such components units as may be derived from diol components, for example, 2,2-bis(4-hydroxyphenyl-3,5-dimethylphenyl)propane, bis(4-hydroxyphenyl) methane, 1,1-bis(4-hydroxyphenyl)ethane, 2,2-bis(4-hydroxyphenyl) butane, 2,2-bis(4-hydroxy-3,5-diethylphenyl)propane, 2,2-bis(4-hydroxy-3,5-dipropylphenyl)propane, 1,1-bis(4-hydroxyphenyl)cyclohexane, bis(4-hydroxyphenyl)ketone, bis(4-hydroxyphenyl)ether, bis(4-hydroxyphenyl)thioether, bis(4-hydroxyphenyl)sulfone and 4,4-dihydroxybiphenyl.

The above-mentioned polycarbonate may contain small amounts of aliphatic diol component units in addition to the aromatic diol component units. The aliphatic diol component units include, for example, such component units as may be derived from diol components of 3-15 carbon atoms, for example, ethylene glycol, 1,3-propanediol, 1,4-butanediol, neopentyl glycol, cyclohexanediol, cyclohexane dimethanol, 1,4-bis($\beta$-hydroxyethoxy)benzene, 1,3-bis($\beta$-hydroxyethoxy)benzene, 2,2-bis(4-$\beta$-hydroxyethoxyphenyl)propane and bis(4-$\beta$-hydroxyethoxyphenyl)sulfone.

In addition to the aromatic diol component units and aliphatic diol component units mentioned above, the polycarbonate may contain, if necessary, small amounts of polyfunctional compound component units. The polyfunctional compound component units include, for example, such component units as may be derived from aromatic polyols such as phloroglucin and 1,2,4,5-tetrahydroxybenzene; aliphatic polyols such as glycerin, trimethylolethane, trimethylolpropane and pentaerythritol; aromatic polybasic acids such as trimellitic acid, trimesic acid and 3,3',5,5'-tetracarboxydiphenyl; aliphatic polybasic acids such as butanetetracarboxylic acid; and oxypolycarboxylic acids such as tartaric acid and malic acid.

In the above-mentioned polycarbonate, the amount of the 2,2-bis(4-hydroxyphenyl)propane component units is usually 50-100 mol %, preferably 70-100 mol %, that of the aromatic diol component units other than the 2,2-bis(4-hydroxyphenyl)propane component units is usually 0-50 mol %, preferably 0-30 mol %, and that of the aliphatic diol component units and the polyfunctional compound component units is usually 0-2 mol %, preferably 0-1 mol %.

The above-mentioned polycarbonates may be prepared, without any particular limit, for example, by a process for preparing polycarbonate by interfacial polymerization of diol component and phosgene or a process for preparing polycarbonate by ester interchange reaction of diol component with carbonic acid diester.

Catalysts used in preparing the above-mentioned polycarbonated by the ester interchange method are those which are commonly used in ester interchange reaction such as antimony compounds, titanium compounds, germanium compounds and tin compounds.

The polycarbonates used in the present invention have an intrinsic viscosity [$\eta$] (a value as measured at 25° C. in o-chlorophenol) of usually less than 1.2 dl/g, preferably 0.3-0.8 dl/g, and a glass transition temperature of usually 120°-160° C., preferably 130°-150° C.

Polyester carbonate copolymers used to constitute the polyester resin compositions of the present invention are the polyester carbonate copolymers as illustrated hereinbefore.

In the polyester resin composition containing such components as mentioned above, the polyalkylene terephthalate is used in an amount of 50-10 parts by weight, preferably 40-20 parts by weight, and the polycarbonate is used in an amount of 50-90 parts by weight, preferably 60-80 parts by weight. Furthermore, the polyester carbonate copolymer is used in an amount of 3-50 parts by weight, preferably 5-30 parts by weight based on 100 parts by weight of the sum total of the above-mentioned polyalkylene terephthalate and polycarbonate.

The polyester resin compositions as illustrated above may be prepared by kneading a mixture comprising the polyalkylene terephthalate, polycarbonate, polyester carbonate copolymer and, if necessary, other resins or additives.

The above-mentioned mixture may be prepared by using ordinary mixing devices and may be then kneaded by using ordinary kneading devices. Examples of the mixing or kneading devices are an extruder, a Banbury mixer and a kneadin roll.

The polyester resin compositions contain the polyester carbonate copolymer in addition to the polyalkylene terephthalate and polycarbonate in the manner as described above, and because the physical properties of the polyester carbonate copolymer are intermediate between those of the polyalkylene terephthalate and the polycarbonate, said polyester resin compositions are found to be excellent in stiffness, heat resistance, impact strength, chemical resistance and moldability without marring properties of the polyalkylene terephthalate and the polycarbonate.

The polyester resin compositions of the present invention, in addition to the above-mentioned polyalkylene terephthalate, polycarbonate and polyester carbonate copolymer, may contain, if necessary, various additives such as phosphate stabilizers, e.g. trimethyl phosphate and triphenyl phosphate, known inorganic fillers, lubricants, slip agents, anti-blocking agents, anti-static agents, anti-foggants and pigments, and other resin components so long as they do not hinder the present invention from accomplishing its objects.

EFFECT OF THE INVENTION

The polyester carbonate copolymers of the present invention have an intrinsic viscosity [$\eta$], as measured at 25° C. in o-chlorophenol, of 0.4-1.2 dl/g, a glass transition temperature (Tg) of 80°-140° C. with a single peak, and are excellent in mechanical properties such as impact resistance and stress crack resistance, heat resistance and melt flowability at the time of molding, particularly impact strength. Accordingly, the polyester carbonate copolymers of the present invention may be used for various purposes such as molding materials and compatibilizing agents for polyalkylene terephthalates and polycarbonates.

According to the processes for preparing the polyester carbonate copolymers of the present invention, the alkylene terephthalate oligomer [I] and polycarbonate oligomer [II] are blended in the above-mentioned specific proportions, melted and stirred, and the polycondensation reaction is carried out under reduced pressure while removing volatile components, and hence the polyester carbonate copolymers excellent in properties as mentioned above and capable of being used for purposes such as molding materials and the like.

Furthermore, the polyester resin compositions of the present invention contain the polyalkylene terephthalate, polycarbonate and specific polyester carbonate copolymer in specific proportions, and hence are quite excellent in stiffness, heat resistance, chemical resistance, impact resistance and moldability. Moreover, no other properties will decrease by the improvement in the above-mentioned properties. Accordingly, by virtue of the use of the polyester resin compositions of the present invention, there can be prepared molded articles or stretched molded articles excellent in stiffness, heat resistance, chemical resistance and impact resistance.

The present invention is illustrated below with reference to examples, but it should be construed that the invention is in no way limited to those examples.

The alkylene terephthalate oligomer [I] and carbonate oligomer [II] used in examples were prepared according to the processes shown in the synthesis examples.

The intrinsic viscosity [$\eta$] of the polyester carbonate copolymers and others was measured at 25° C. in o-chlorophenol. The glass transition temperature of the polyester carbonate copolymer was measured by using a differential scanning calorimeter at a temperature rise and drop rate of 10° C./min.

Thermal properties and mechanical strength of the polyester carbonate copolymer were measured according to standard method of measurement stipulated in JIS K 6719, JIS K 6911 and JIS K 6719.

Further, transparency of the polyester carbonate copolymer was measured by using a haze meter, NDH-20D Model manufactured by Nihon Denshoku Kogyo K.K.

SYNTHESIS EXAMPLE 1

A reaction vessel equipped with a stirrer, an $N_2$ introducing pipe and a distilling-off pipe was charged with 706 parts by weight of diphenyl carbonate and 502 parts by weight of bis(4-hydroxyphenyl)propane, and the charges were melted at 240° C. The reaction vessel was then charged with 0.05 part by weight of titanium tetra(isopropoxide), and the reaction was carried out for 4 hours in an $N_2$ atmosphere. The reaction mixture was further stirred for 1 hour under a reduced pressure of 2 mm Hg, and the reaction product was withdrawn from the reaction vessel, pulverized and dried to obtain 671 parts by weight of a carbonate oligomer.

The carbonate oligomer obtained had an intrinsic viscosity [$\eta$] of 0.08 dl/g, and a number average polymerization degree of 3.

SYNTHESIS EXAMPLE 2

A mixture of 1734 parts by weight of terephthalic acid and 713 parts by weight of ethylene glycol was stirred for 4 hours under 2 atmospheres. Thereafter, 0.3 part by weight of germanium dioxide, 0.3 part by weight of tetraethylammonium hydroxide and 0.4 part by weight of methyl acid phosphate were added, and the reaction was carried out at 260° C. for 2 hours under 1 atmosphere. The reaction product was withdrawn, cooled, pulverized and dried to obtain 1500 parts by weight of an ethylene terephthalate oligomer.

The ethylene terephthalate oligomer obtained had an intrinsic viscosity [$\eta$] of 0.09 dl/g, and a number average polymerization degree of 3.

EXAMPLE 1

A reaction vessel equipped with a stirring device and a device for condensing the distillate fraction by operating under reduced pressure was charged with 50 parts by weight of the carbonate oligomer obtained in Synthesis Example 1 and 50 parts by weight of the ethylene terephthalate oligomer obtained in Synthesis Example 2 and 0.1 part by weight of stannous oxalate, and the charges were melted by heating at 270° C. in a nitrogen atmosphere. The pressure of the system was reduced with stirring from atmospheric pressure to about 2 mm Hg over a period of about 30 minutes, and the stirring was continued at 290° C. for about 3 hours under a reduced pressure of about 2 mm Hg. After the completion of the above-mentioned heat treatment, the pressure within the system was returned to atmospheric pressure using nitrogen, and the mixture was withdrawn in strand form under pressure, cut to granules by means of a cutter to obtain a transparent polyester carbonate copolymer.

The polyester carbonate copolymer obtained was transparent and had an intrinsic viscosity [$\eta$] of 0.60 dl/g and a glass transition temperature (Tg) of 104° C. This granular polyester carbonate copolymer was press molded at about 270° C. to prepare a specimen which was then measured for bending strength, modulus of elasticity in bending, Izod impact resistance (notched, 23° C.) and haze.

Results obtained are shown in Table 1.

EXAMPLES 2-5

Example 1 was repeated with the exception that as shown in Table 1, the amount of the ethylene terephthalates oligomer used was changed to 70 parts by weight, 60 parts by weight, 40 parts by weight and 30 parts by weight and, in correspondence thereto, the amount of the carbonate oligomer used was changed to 30 parts by weight, 40 parts by weight, 60 parts by weight and 70 parts by weight, to obtain polyester carbonate copolymers which were then evaluated for their physical properties.

Results obtained are shown in Table 1.

The polyester carbonate copolymer obtained in Example 4, the following structural units were contained in the following amounts.

|  | Amounts (mol %) |
|---|---|
| (1) Linkage modes of Bisphenol A | |
| $-O-\underset{}{\bigcirc}-\underset{CH_3}{\overset{CH_3}{\underset{|}{C}}}-\underset{}{\bigcirc}-OCH_2CH_2O-$ [I] | 33 mol % |
| $-O-\underset{}{\bigcirc}-\underset{CH_3}{\overset{CH_3}{\underset{|}{C}}}-\underset{}{\bigcirc}-O\underset{O}{\overset{}{\underset{\|}{C}}}-\underset{}{\bigcirc}-\underset{O}{\overset{}{\underset{\|}{C}}}-$ [II] | 41 mol % |

-continued

|  | | Amounts (mol %) |
|---|---|---|
| structure with two isopropylidene-bisphenyl groups linked by carbonate | [III] | 15 mol % |
| structure with isopropylidene-bisphenyl linked to -O-C(=O)-O-CH$_2$CH$_2$O- | [IV] | 11 mol % |

(2) Linkage modes of terephthalic acid

|  | | |
|---|---|---|
| -C(=O)-C$_6$H$_4$-C(=O)-O-CH$_2$CH$_2$O- | [V] | 56 mol % |
| -C(=O)-C$_6$H$_4$-C(=O)-O-(isopropylidene-bisphenyl)-O- | [VI] | 44 mol % |

COMPARATIVE EXAMPLE 1

Example 1 was repeated with the exception that the amounts of the ethylene terephthalate oligomer and carbonate oligomer used were changed to 90 parts by weight and 10 parts by weight, respectively, to obtain a transparent polyester carbonate copolymer. The polyester carbonate copolymer obtained had an intrinsic viscosity [η] of 0.58 dl/g. The glass transition temperature (Tg) of this copolymer was 78° C., observing an absorption only at one peak, thus no practical difference was observed from the glass transition temperature of polyethylene terephthalate.

The evaluation of the above-mentioned physical properties was conducted on the basis of results obtained by the test methods as will be mentioned later.

Method of Evaluation

The impact resistance test was conducted in accordance with ASTM-D-256 by using a notched specimen of 2 mm in thickness.

The modulus of elasticity was measured in accordance with ASTM-D-790.

The heat resistance test was conducted in accordance with ASTM-D-648, wherein a specimen of 126 mm in length, 12.6 mm in width and 6.3 mm in thickness under

TABLE 1

|  | Ethylene terephthalate oligomer used (wt part) | Carbonate oligomer used (wt part) | Intrinsic viscosity [η] (dl/g) | Glass transition temperature [Tg] (°C.) | Thermal deformation temp. (°C.) | Mechanical strength | | | Haze (%) |
|---|---|---|---|---|---|---|---|---|---|
|  |  |  |  |  |  | Bending strength (kg/cm$^2$) | Modulus of elasticity in bending (kg/cm$^2$) | Izod impact strength (notched, 23° C.) (kg · cm/cm) |  |
| Example 1 | 50 | 50 | 0.59 | 108 | 93 | 1180 | 26200 | 9.5 | 5 |
| Example 2 | 70 | 30 | 0.62 | 97 | 92 | 950 | 26500 | 5.9 | 7 |
| Example 3 | 60 | 40 | 0.60 | 103 | 93 | 920 | 23900 | 7.5 | 7 |
| Example 4 | 40 | 60 | 0.60 | 114 | 110 | 1070 | 25100 | >80 | 3 |
| Example 5 | 30 | 70 | 0.57 | 120 | 115 | 1150 | 25800 | >80 | 4 |
| Comp. Ex. 1 | 90 | 10 | 0.58 | 78 | 70 | 1170 | 28000 | 3.0 | 3 |

EXAMPLE 6

A polyester resin composition was prepared by kneading a mixture comprising 10 parts by weight of the polyester carbonate copolymer obtained in Example 2, 30 parts by weight of polyethylene terephthalate ([η]=0.76 dl/g, a product of Mitsui Pet Resin K.K. under the trade name of J125) and 70 parts by weight of polycarbonate ([η]=0.55 dl/g, a product of Teijin Kasei K.K. under the trade name of Panlite L-1250).

The polyester resin composition obtained was subjected to heat treatment at 150° C. for 2 hours in a nitrogen atmosphere, and then evaluated for impact resistance, heat resistance, heat insulating properties and chemical resistance.

Results obtained are shown in Table 2.

a bending stress of 18.6 kg/cm$^2$ was elevated in temperature at a rate of 2° C./min, and a temperature was measured at the time when the amount of deflection reached 0.254 mm.

The chemical resistance test was conducted by applying deflection in bending to a specimen and immersing the specimen in carbon tetrachloride. That is, the specimen was held by a tool having a span distance of 101.6 mm, and after applying deflection in bending to the specimen under load, the specimen was immersed together with the tool for 1 minute in carbon tetrachloride to visually observe the state of occurrence of cracks in the thus treated specimen.

In Table 2, the symbols used have the following meaning.

O . . . Passed.
Δ . . . Minute cracks occurred.
X . . . Cracks occurred almost all over the specimen.

XX ... The specimen ruptured during the test.

COMPARATIVE EXAMPLE 2

A polyester resin composition was prepared by repeating Example 6 with the exception that no polyester carbonate copolymer was used.

The polyester resin composition was evaluated for impact resistance, heat resistance, heat insulating properties and chemical resistance.

Results obtained are shown in Table 2.

COMPARATIVE EXAMPLE 3

A polyester resin composition was prepared by repeating Example 6 with the exception that in place of the polyester carbonate copolymer, there was used a copolymer of terephthalic acid, ethylene glycol and cyclohexane dimethanol (a product of Eastman Kodak Co., under the registered trade name of PETG ® 6763).

The polyester resin composition obtained was evaluated for impact resistance, heat resistance, heat insulating properties and chemical resistance.

Results obtained are shown in Table 2.

COMPARATIVE EXAMPLE 4

A polyester resin composition was prepared by repeating Example 6 with the exception that in place of the polyester carbonate copolymer, a maleic ethylene propylene rubber (a product of Mitsui Petrochemical Industries, Ltd. under the trade name of TOUGHMER MPO 610).

The polyester resin composition obtained was evaluated for impact resistance, heat resistance, heat insulating properties and chemical resistance.

Results obtained are shown in Table 2.

TABLE 2

| | Example 6 | Comparative Example | | |
|---|---|---|---|---|
| | | 2 | 3 | 4 |
| IZ impact strength (kg · cm/cm) | at least 80 | 3.2 | at least 80 | 20 |
| Modulus of elasticity ($\times 10^4$ kg/cm$^2$) | 2.67 | 2.50 | 2.50 | 2.0 |
| HDT (°C.) | 120 | 125 | 120 | 105 |
| Chemical resistance | | | ×× | |

In Table 2 above, the specimen having IZ impact strength of at least 80 kg shows that said specimen withstood this impact strength and was not ruptured thereby.

What is claimed is:

1. A polyester resin composition comprising (i) 50–10 parts by weight of polyalkylene terephthalate, (ii) 50–90 parts by weight of polycarbonate (provided (i)+(ii)=100 parts by weight) and (iii) 3–50 parts by weight, based on 100 parts by weight of the sum total of (i) and (ii), of a polyester carbonate copolymer, said polyester carbonate copolymer (iii) being a polyester carbonate copolymer obtained by polymerization of a mixture of 20–80% by weight of an alkylene terephthalate oligomer [I] containing ethylene terephthalate as main structural units and having an intrinsic viscosity [η], as measured at 25° C. in o-chlorophenol, of less than 0.6 dl/g and 20–80% by weight of a carbonate oligomer [II] containing 2,2-bis(4-hydroxyphenyl)propane as main structural units and having an intrinsic viscosity [η], as measured at 25° C. in o-chlorophenol, of less than 0.6 dl/g, and said copolymer having an intrinsic viscosity [η], as measured at 25° C. in o-chlorophenol, of 0.4–1.2 dl/g and a glass transition temperature (Tg) of 80°–140° C. with a single peak.

2. The polyester resin composition as claimed in claim 1 wherein the amount of the alkylene terephthalate oligomer [I] present is 20–50% by weight and the amount of the carbonate oligomer [II] present is 50–80% by weight.

* * * * *